(12) United States Patent
Mitsunabe

(10) Patent No.: US 8,590,930 B2
(45) Date of Patent: Nov. 26, 2013

(54) GAS GENERATOR

(71) Applicant: Daicel Corporation, Osaka (JP)

(72) Inventor: Atsushi Mitsunabe, Tatsuno (JP)

(73) Assignee: Daicel Corporation, Osaka (JP)

( * ) Notice: Subject to any disclaimer, the term of this patent is extended or adjusted under 35 U.S.C. 154(b) by 0 days.

(21) Appl. No.: 13/740,877

(22) Filed: Jan. 14, 2013

(65) Prior Publication Data

US 2013/0199398 A1 Aug. 8, 2013

Related U.S. Application Data

(60) Provisional application No. 61/595,425, filed on Feb. 6, 2012.

(30) Foreign Application Priority Data

Feb. 6, 2012 (JP) .................................. 2012-23133

(51) Int. Cl.
*B60R 21/26* (2011.01)

(52) U.S. Cl.
USPC ............ 280/741; 102/200; 102/530; 102/531

(58) Field of Classification Search
USPC .................. 280/736, 741; 102/200, 530, 531
See application file for complete search history.

(56) References Cited

U.S. PATENT DOCUMENTS

| | | | |
|---|---|---|---|
| 5,924,728 A | 7/1999 | Evans et al. | |
| 7,370,885 B2 * | 5/2008 | Stevens | 280/741 |
| 7,726,241 B2 * | 6/2010 | Stevens | 102/202.12 |
| 7,744,124 B2 * | 6/2010 | Yamazaki | 280/736 |
| 7,845,278 B2 * | 12/2010 | Brisighella et al. | 102/202.5 |
| 8,176,851 B2 * | 5/2012 | Kodama et al. | 102/530 |
| 2002/0079680 A1 * | 6/2002 | Moquin et al. | 280/736 |
| 2004/0226472 A1 | 11/2004 | Oda | |
| 2004/0245753 A1 * | 12/2004 | Kato et al. | 280/736 |
| 2005/0126417 A1 * | 6/2005 | Parker et al. | 102/202.12 |
| 2006/0033317 A1 * | 2/2006 | Stevens | 280/741 |
| 2006/0150855 A1 * | 7/2006 | Maruyama et al. | 102/202.14 |
| 2007/0096451 A1 * | 5/2007 | Stevens | 280/806 |
| 2011/0210553 A1 * | 9/2011 | Engelhardt et al. | 290/44 |
| 2012/0024186 A1 | 2/2012 | Mitsunabe et al. | |

FOREIGN PATENT DOCUMENTS

| | | |
|---|---|---|
| EP | 1227016 A1 | 7/2002 |
| JP | 2003-161599 A | 6/2003 |
| WO | 2006/014441 A2 | 2/2006 |

* cited by examiner

*Primary Examiner* — Toan To
(74) *Attorney, Agent, or Firm* — Birch, Stewart, Kolasch & Birch, LLP

(57) ABSTRACT

A gas generator includes,
an igniter having an ignition portion and a conductive pin
a collar holding the igniter,
a metallic cup-shaped case fixed to the collar and having a fragile portion.
The collar includes a metallic portion and a resin part enclosing the ignition portion.
An outer diameter of the metallic portion is larger than an outer diameter of the resin part.
The cup-shaped case has an annular portion bent inward at an opening thereof.
The annular bent portion includes a bent corner, an annular tilted surface, and an annular terminal end. The annular tilted surface includes an outer tilted surface facing toward a side of a peripheral surface of the cup-shaped case and an inner annular tilted surface facing the opposite side.
The inner annular tilted surface of the annular bent portion presses against the resin portion.

7 Claims, 5 Drawing Sheets

(a)

(b)

ved by FIG. 1, and in (b), a partial enlarged view of the gas

GAS GENERATOR

This nonprovisional application claims priority under 35 U.S.C. §119(a) to Patent Application No. 2012-023133 filed in Japan on 6 Feb. 2012 and 35 U.S.C. §119(e) to U.S. Provisional application No. 61/595,425 filed on 6 Feb. 2012, which are incorporated by reference.

BACKGROUND OF INVENTION

1. Filed of Invention

The present invention relates to a gas generator suitable for a restraining device such as a seat belt pretensioner of a vehicle.

A small gas generator, which accommodates an igniter and a gas generating agent in a case, is typically used in a pretensioner that pulls a seat belt by using generated gas as a drive source. In order for a pretensioner to function properly, gas from the gas generator has to be supplied to the pretensioner without any leakage. It is also preferred that the gas generator be easy to assemble and have a simple structure.

2. Description of Related Arts

U.S. Pat. No. 5,924,728 is known as an example of such a structure including an igniter, a gas generating agent, and a case accommodating the gas generating agent.

In U.S. Pat. No. 5,924,728, a fuel bottle 22 is attached to an adapter 67 mounted on an end portion 62 of a combustion chamber section 50 of a gas generator as shown in FIG. 5 and FIG. 6. In the fuel bottle 22, a lock connector 78 is formed in a portion of an opening end, and an inward-folded portion of the lock connector 78 is attached to the outer peripheral surface of the adapter 67. The lock connector 78 is fixed by mating with a separate lock connector 80 as shown in FIGS. 3A to 3C.

SUMMARY OF INVENTION

The present invention provides invention I of a gas generator including:

an igniter having an ignition portion and a conductive pin;

a collar holding the igniter, a metallic cup-shaped case fixed to the collar and having a fragile portion, and charged therein with a gas generating agent, the collar being formed by integrating a metallic portion and a resin portion, and the resin portion having a resin columnar part enclosing at least part of a peripheral surface of the ignition portion, the metallic portion being in a substantially cup-like shape having an annular bottom surface part and a circumferential wall, and an outer diameter of the circumferential wall being set to be larger than an outer diameter of the resin columnar part, the cup-shaped case having an annular bent portion obtained by bending inward an end portion of an opening thereof, the annular bent portion including an annular bent corner, an annular tilted surface, and an annular terminal end, and the annular tilted surface including an outer annular tilted surface facing toward a side of a peripheral surface of the cup-shaped case and an inner annular tilted surface facing the opposite side thereof, in the cup-shaped case and the collar, the inner annular tilted surface of the annular bent portion pressing against a peripheral surface of the columnar part of the resin portion.

The present invention provides the above shown gas generator, the above gas generator used in a pretensioner system, and a pretensioner system improved with the above shown gas generator.

BRIEF DESCRIPTION OF DRAWINGS

The present invention will become more fully understood from the detailed description given hereinbelow and the accompanying drawings which are given by way of illustration only, and thus are not limitative of the present invention and wherein.

DETAILED DESCRIPTION OF INVENTION

Figure 1:
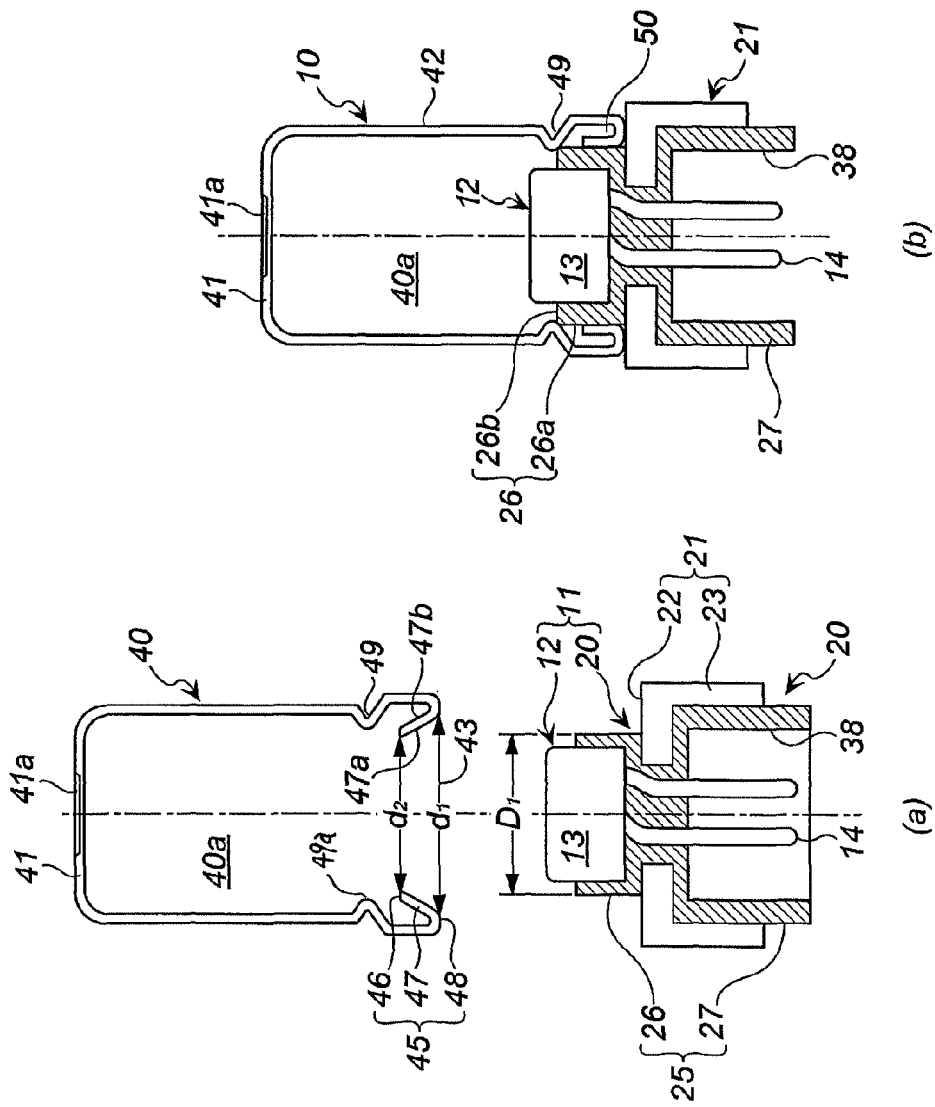
FIG. 1 shows, in (a), an axial sectional view of a gas generator prior to assembling, and in (b), an axial sectional view of the gas generator after the assembling.

In U.S. Pat. No. 5,924,728, the lock connector 80 is fixed by welding or soldering, and the manufacturing process includes these steps, and therefore the process is complicated. Furthermore, the number of parts is increased by using the lock connector 80. For these reasons, the technique described in U.S. Pat. No. 5,924,728 still has room for improvement.

Further, in the gas generator of the present invention, it is preferable that the cup-shaped case and the collar are fixed to each other by pressing the inner annular tilted surface of the annular bent portion against the peripheral surface of the columnar part of the resin portion. It may be that the annular bent corner abuts against the annular bottom surface part of the metallic portion of the collar.

The present invention provides a gas generator which is easy to assemble, has a simple structure and does not leak gas during actuation.

The present invention provides preferable inventions I-2 to I-7 as follows:

Invention I-2

The gas generator according to Invention I, wherein the cup-shaped case and the collar are fixed to each other by pressing the inner annular tilted surface of the annular bent portion against the peripheral surface of the columnar part of the resin portion and abutting the annular bent corner against the annular bottom surface part of the metallic portion of the collar.

Invention I-3

The gas generator according to Inventions I or I-2, wherein the cup-shaped case and the collar are fixed to each other in a state in which part of the inner annular tilted surface of the annular bent portion is pressed against the peripheral surface of the resin columnar part, and a portion including the annular terminal end is embedded into the resin columnar part.

Invention I-4

The gas generator according to any one of Inventions I to I-3, wherein the annular bent portion of the cup-shaped case has an annular protrusion protruding from the inner annular tilted surface in the vicinity of the annular terminal end, and the cup-shaped case and the collar are fixed to each other in a state in which the inner annular tilted surface of the annular bent portion is pressed against the peripheral surface of the resin columnar part, and the annular protrusion is embedded into the resin columnar part.

Invention I-5

The gas generator according to any one of Inventions I to I-4, wherein the cup-shaped case has a concave portion receding inward at the peripheral surface thereof, an inner tip of the concave portion is abutted against the resin columnar part, and an annular space communicating with an inner space of the cup-shaped case charged with the gas generating agent is formed by an inner wall surface of the annular bent portion and the resin columnar part.

Invention I-6

The gas generator according to any one of Inventions I to I-4, wherein the cup-shaped case has a concave portion receding inward at the peripheral surface thereof, the resin columnar part has a threaded groove at an outer surface that is not in contact with the inner annular tilted surface of the annular bent portion, and the inner tip of the concave portion of the cup-shaped cap is abutted against a valley portion of the threaded groove.

Invention I-7

The gas generator according to any one of Inventions I to I-4, wherein the cup-shaped case has one or a plurality of concave portions receding inward at the peripheral surface thereof, the resin columnar part has one or a plurality of flat surfaces or grooves formed in the axial direction at the peripheral surface thereof, and the inner tip of the one or plurality of concave portions of the cup-shaped case is abutted against one or a plurality of flat surfaces or grooves of the resin columnar part.

The igniter is an electric igniter and has an ignition portion, which includes a container accommodating an igniting agent, and a conductive pin.

The collar is obtained by integrating the resin portion and the metallic portion and integrally formed by injection-molding a resin onto the metallic portion (metallic collar).

In the igniter, the entire peripheral surface of the ignition portion or part thereof and the entire bottom surface (surface where the conductive pins are connected) thereof are covered with the resin portion. The entire top surface (top surface of the container directly facing the bottom surface of the cup-shaped case) of the ignition portion is exposed. It is also possible that the central portion thereof is exposed and a circumferential edge that is in contact with the peripheral surface is covered by the resin portion. It is also possible that the entire top surface may be covered with a resin, provided that the ignition portion can operate properly (when the thickness of the resin coating is reduced). Further, the container accommodating the igniting agent may be covered with a thin insulating film, and then covered with the resin portion so that a part of the film is exposed.

The resin portion forming the collar has a resin columnar part. The outer diameter of the resin columnar part is set to be less than the outer diameter of a metallic portion, and a step is formed between the resin columnar part and the metallic portion. The step surface is an annular bottom surface part of the metallic portion.

The cup-shaped case accommodates a known gas-generating agent inside thereof. The cup-shaped case is formed from an elastic material made of a metal such as stainless steel, iron, and the like.

The cup-shaped case has a fragile portion. The fragile portion is preferentially ruptured when the igniter is actuated and the gas generating agent burns. The fragile portion is formed in a bottom surface or a peripheral surface of the cup-shaped case and is ruptured, broken, and separated by a load that is less than the load necessary to detach the cup-shaped case from the collar during actuation. Since the fragile portion is thus always ruptured earlier, the cup-shaped case is not separated from the collar.

The cup-shaped case has an annular bent portion, and the annular bent portion has an annular bent corner, an annular tilted surface, and an annular terminal end.

The inner diameter ($d1$) of the annular bent corner of the cup-shaped case is set to be larger than the outer diameter ($D1$) of the resin columnar part of the collar.

The inner diameter ($d2$) of the annular terminal end of the cup-shaped case is set to be less than the outer diameter ($D1$) of the resin columnar part of the collar.

Thus, the relation of $d2 < D1 < d1$ is obtained.

When the above relationship is obtained, in a process of fitting the cup-shaped case onto the collar, the annular terminal end is pressed against the resin columnar part and the annular tilted surface is deformed so as to be pushed and expanded outward, thereby conversely, a force (counterforce) is generated such that the annular tilted surface is contracted inward.

Under the effect of such a counterforce, when the cup-shaped case is attached to the collar, the annular tilted surface or the annular terminal end is abutted (pressed) and fixed against the resin columnar part.

For such a counterforce to be demonstrated, it is preferred that $d2 < D1 < d1$ be adjusted to specific ranges. Before the cup-shaped case is attached to the collar:

a radio of $d2/D1$ is preferably 0.8 to 0.98, more preferably 0.85 to 0.98, and still more preferably 0.9 to 0.98; and a ratio of $D1/d1$ is preferably 0.8 to 1, more preferably 0.85 to 1, and still more preferably 0.9 to 1.

The cup-shaped case and the collar can be fixed in a state in which a part of the inner annular tilted surface of the annular bent portion is in press-contact with the peripheral surface of the resin columnar part, and a portion including the annular terminal end is embedded into the resin columnar part.

When a portion including the annular terminal end of the cup-shaped case is embedded into the resin columnar part, the fixing strength between the cup-shaped case and the collar is increased. A state in which the annular terminal end is embedded into the resin columnar part can be realized by pulling out the cup-shaped case after fitting into the collar, or by rotating the cup-shaped case with respect to the resin columnar part.

In the cup-shaped case, the annular bent portion can be provided with an annular protrusion protruding from the inner annular tilted surface in the vicinity of the annular terminal end.

When the cup-shaped case having such an annular protrusion is used, the cup-shaped case can be fixed in a state in which the inner annular tilted surface of the annular bent portion is in press-contact with the peripheral surface of the resin columnar part, and the annular protrusion is embedded into the resin columnar part.

When the cup-shaped case having such an annular protrusion is used and the annular protrusion embedded into the resin columnar part, the fixing strength of the cup-shaped case and the collar is increased.

The cup-shaped case having a concave portion receding inward at the peripheral surface can be used. The concave portion is formed in the cup-shaped case at a position (height position) where the inner tip of the annular concave portion is abutted against the resin columnar part.

When the cup-shaped case having a concave portion receding inward at the peripheral surface is used, the inner tip of the concave portion is abutted against the resin columnar part, and an annular space communicating with the inner space of the cup-shaped case charged with the gas-generating agent is formed by the inner wall surface of the annular bent portion and the resin columnar part.

When such an annular space is formed, where the gas generating agent inside the cup-shaped case burns during actuation and combustion gas is generated, the pressure thereof acts uniformly on the wall surfaces (inner wall surface of the annular bent portion and the outer surface of the resin columnar part) forming the annular space. Therefore, the fixing strength of the annular bent portion and the resin columnar part is increased and the gas is prevented from leaking therebetween.

In the cup-shaped case, a concave portion receding inward can be provided at the peripheral surface.

The collar can be used in which the resin columnar part has a threaded groove at an outer surface that is not in contact with the inner annular tilted surface of the annular bent portion.

When such cup-shaped case and collar are used, the inner tip of the concave portion of the cup-shaped case can be abutted against a valley portion of the threaded groove of the resin columnar part, and therefore the fixing strength of the cup-shaped case and the collar is increased. The threaded groove is formed at the outer peripheral surface on the upper side of the resin columnar part. The outer peripheral surface on the lower side is abutted against the annular tilted surface or the annular terminal end of the cup-shaped case. In order to prevent the annular terminal end from interfering with the threaded groove when the cup-shaped case is fitted, the outer diameter of the resin columnar part may be decreased at the peripheral surface on the upper side where the threaded groove is formed and increased at the peripheral surface on the lower side, and the inner tip of the concave portion may be caused to protrude inward beyond the annular terminal end.

In the cup-shaped case, a single or a plurality of concave portions receding inward can be provided at the peripheral surface thereof.

In the collar, a single or a plurality of flat surfaces or grooves formed in the axial direction can be provided at the peripheral surface of the resin columnar part.

When the cup-shaped case having a single concave portion is used and the collar in which the resin columnar part has a single flat surface or groove is used, the alignment of the collar with respect to the cup-shaped case is facilitated by abutting the single inner tip of the concave portion of the cup-shaped case against the single flat surface or groove. Further, the cup-shaped case can be prevented from rotating with respect to the collar after assembling, and gas generators with uniform specifications can be provided.

When the cup-shaped case having two concave portions is used and the collar in which the resin columnar part has two flat surfaces or grooves is used, the alignment is facilitated and the rotation in the circumferential direction is prevented by abutting the inner tips of the two concave portions of the cup-shaped case against the two flat surfaces or grooves.

Alternately, the cup-shaped case is formed with a plurality of concave portions, while the resin columnar part is formed with flat surfaces or grooves to abut against some of the concave portions. The concave portions abut against, or fitted into, the flat surfaces of grooves to fix the position and block a rotation. The remaining concave portions abut against the resin columnar part to fix the cup-shaped case to the resin columnar part.

In the gas generator in accordance with the present invention, the cup-shaped case of a specific shape is combined with the igniter assembly having a collar of a specific shape. As a result, the gas generator is easy to assemble, fixing strength and airtightness of contact portions are high, and thereby, product reliability is high.

Embodiments of the Invention (1) Gas Generator Shown in FIG. 1

An embodiment of a gas generator 10 in accordance with the present invention will be described hereinbelow with reference to (a) and (b) in FIG. 1.

(a) in FIG. 1 shows a gas generator in a state prior to assembling, and FIG. 1(b) shows a gas generator in a state after the assembling.

The gas generator 10 shown in FIG. 1 is used for a seat belt retractor.

The gas generator 10 includes an igniter assembly 11, obtained by fixing an electric igniter 12 to a collar 20, and a cup-shaped case 40 charged with a gas generating agent.

The igniter 12 is of a type generally used in gas generators for airbag apparatuses and seat belt retractors, and the igniter includes an ignition portion 13 and a pair of conductive pins 14.

The collar 20 is formed by a combination of a metallic portion 21 and a resin portion 25 integrated with the metallic portion 21. The resin forming the resin portion 25 can be the one disclosed in JP-A No. 2003-161599.

The metallic portion 21 is made from stainless steel or iron and has a shallow substantially cup-like shape with a hole in the bottom surface thereof for allowing the conductive pins 14 to pass therethrough. The metallic portion 21 has an annular bottom surface part 22 and a circumferential wall surface part 23.

The resin portion 25 has a resin columnar part 26, that encloses and fixes the ignition portion 13 of the igniter and a pair of conductive pins 14, and a cylindrical wall portion 27 forming a space for fitting a connector.

The resin columnar part 26 has a peripheral surface 26a and a bottom surface 26b.

The outer diameter of the circumferential wall surface part 23 is set to be larger than the outer diameter of the resin columnar part 26, and a step is formed therebetween. A portion of the annular bottom surface part 22 that is not covered by the resin forms the step surface.

The cup-shaped case 40 is made from a metal such as stainless steel and iron, having a thickness of about 0.3 mm to 0.8 mm.

The cup-shaped case 40 has a bottom surface 41, a circumferential wall surface 42, and an opening 43.

A fragile portion 41a is formed in the central portion of the bottom surface 41, but the fragile portion 41a may be formed in the circumferential wall surface 42, or in both the bottom surface 41 and the circumferential wall surface 42.

The fragile portion 41a is a part in which a notch or a score is formed, or a reduced-thickness part that is thinner than the remaining bottom surface 41.

An inner space 40a is charged with a known gas-generating agent for use in gas generators employed in seat belt retractors (not shown in the drawings).

A concave portion 49 receding inward is provided in the circumferential wall surface 42 of the cup-shaped case 40 on the opening 43 side.

An inner tip 49a of the concave portion 49 is abutted against the peripheral surface 26a of the resin columnar part 26 or a boundary portion of the peripheral surface 26a and the bottom surface 26b.

An annular bent portion 45 is formed by inward bending the end portion of the cup-shaped case 40 at the opening 43.

The annular bent portion 45 has an annular bent corner 48, an annular tilted surface 47, and an annular terminal end 46.

The annular tilted surface 47 includes an outer annular tilted surface 47b on the circumferential wall surface 42 side of the cup-shaped case 40 and an inner annular tilted surface 47a on the opposite side.

The length of the annular tilted surface 47 (the length from the annular bent corner 48 to the annular terminal end 46) is set to be less than the height of the resin columnar part 26.

The inner diameter (d1) of the annular bent corner 48 of the cup-shaped case 40 is set larger than the outer diameter (D1) of the resin columnar part 26 of the collar 20.

The inner diameter (d2) of the annular terminal end 46 of the cup-shaped case 40 is set less than the outer diameter (D1) of the resin columnar part 26 of the collar 20.

When the d2<D1<d1 are satisfied, in the process of fitting the cup-shaped case 40 onto the collar 20, the annular tilted surface 47 is deformed so as to be pushed and expanded outward and thereby conversely, a force (counterforce) is generated such that the annular tilted surface 47 is contracted inward.

Under the effect of such a counterforce, when the cup-shaped case 40 is attached to the collar 20, the annular tilted surface 47 (inner annular tilted surface 47a) is pressed and abutted against (in a press-contact with) and fixed to the resin columnar part 26.

In the present embodiment, at a stage before the cup-shaped case 40 is attached, a ratio of d2/D1 ratio is adjusted to 0.8 to 0.98 and a ratio of D1/d1 is adjusted to 0.8 to 1.

The cup-shaped case 40 and the collar 20 are fixed to each other by the inner annular tilted surface 47a of the annular tilted surface 47 being in press-contact with the peripheral surface 26a of the resin columnar part 26, and the annular bent corner 48 being in press-contact with the flat surface (annular bottom surface part) 22 of the metallic portion.

The resin columnar part 26, to which the inner annular tilted surface 47a is in press-contact, has an uniform outer diameter (D1). That is, the resin columnar part 26 in a side of the annular bottom surface part 22 has the uniform diameter. Meanwhile, the part not being in press-contact with the inner annular tilted surface 47a may be a tilted surface or a stepped surface with a smaller outer diameter in the upper portion (on the cup-shaped case 40 side in FIG. 1(a)).

An annular space 50 is formed by the inner wall surface of the annular bent portion 45 and the resin columnar part 26.

A method for assembling the gas generator 10 shown in (a) and (b) in FIG. 1 is described below.

The gas generator is held in a state in which the bottom surface 41 of the cup-shaped case 40 is on the lower side, that is, in reverse with respect to the configuration shown in (a) in FIG. 1, and a predetermined amount of a gas generating agent is charged into the internal space 40a.

The igniter assembly 11 is then fitted into the opening 43 of the cup-shaped case 40 from the igniter 12 (ignition portion 13) side. The d2<D1<d1 is satisfied prior to the fitting.

The cup-shaped case 40 is made from an elastic metal and the annular tilted surface 47 is inclined. Therefore, the fitting operation is easily performed even when d2<D1.

The annular tilted surface 47 is then fitted to the resin columnar part 26, as shown in FIG. 1(b), while being deformed so as to increase d2 (that is, deformed so as to obtain d2=D1).

At this time, the inner annular tilted surface 47a is in press-contact with the peripheral surface 26a of the resin columnar part 26 and therefore the cup-shaped case 40 is strongly fixed to the collar 20 (igniter assembly 11).

Since the thickness of the cup-shaped case 40 is small, as described above, in such a state, the annular terminal end 46 or the inner annular tilted surface 47a is brought into close contact with the peripheral surface 26a of the resin columnar part 26.

At the attachment stage, since the peripheral surface 26a of the resin columnar part 26 on the bottom surface 26b side has no protrusion, a step, or a part having an enlarged outer diameter (enlarged-diameter part), the fitting operability is good.

In some cases, a metal deforms to a large degree and does not return to the original shape. When the above-mentioned protrusion, the step, or the part having an enlarged outer diameter (enlarged-diameter part) is formed and a state as shown in FIG. 1(b) is assumed, the opening 43 (annular bent portion 45) that has been expanded to a large degree does not return to the original shape, therefore the pressing force of the inner annular tilted surface 47a toward the peripheral surface 26a of the resin columnar part 26 is expected to be insufficient. However, in the present embodiment, such a problem is not encountered because the resin columnar part 26 has a uniform outer diameter.

The state before the actuation of the gas generator shown in FIG. 1 and the operations performed after the actuation will be described below.

Before the actuation, the cup-shaped case 40 and the collar 20 are fixed to each other by the inner annular tilted surface 47a of the annular tilted surface 47 being in press-contact with the peripheral surface of the columnar part 26 of the resin portion 25, and the annular bent corner 48 being in a press-contact with the flat surface (annular bottom surface part) 22 of the metallic portion 21.

The inner tip 49a of the concave portion 49 is abutted against the peripheral surface 26a of the resin columnar part 26 or a boundary portion of the peripheral surface 26a and the bottom surface 26b.

Thus, there is many contact portions between the cup-shaped case 40 and the collar 20, and therefore the cup-shaped case 40 and the collar 20 are sufficiently fixed to each other and, at the same time, permeation of the air (moisture) from outside atmosphere is prevented.

The gas generator operates as follows.

When an ignition current reaches the igniter 12, an explosive of the ignition portion 13 is burnt and combustion products (flame, high-temperature gas, and the like) are generated.

The combustion products ignite the gas generating agent in the inner space 40a and generate combustion gas.

When the combustion gas is generated inside the cup-shaped case 40, the pressure inside the cup-shaped case 40 rises and the cup-shaped case is expanded in entirety.

At this point, since the cup-shaped case 40 and the collar 20 (igniter assembly 11) are fixed to each other at the annular bent portion 45 (annular tilted surface 47) and the resin portion 25 (resin columnar part 26), the cup-shaped case 40 is prevented from detaching in the axial direction. In particular, since the force necessary to rupture the fragile portion 41a is sufficiently less than the force necessary to detach the cup-shaped case 40 from the collar 20, the cup-shaped case 40 is not separated from the collar 20, while the fragile portion 41*a* is not yet ruptured.

Further, the combustion gas also enters the annular space 50, and pressure is uniformly applied to an inner wall surface that forms the annular space 50.

Therefore, since the generation of uniform pressure acts to increase a fixing strength (strength of close contact) between the annular bent portion 45 of the cup-shaped case 40 and the collar 20, gas is prevented from leaking to outside atmosphere from a contact portion of the cup-shaped case 40 and the collar 20 and, at the same time, the effect of preventing the cup-shaped case 40 from detaching from the collar 20 is enhanced.

Further, as can be easily understood by referring to the state prior to the actuation, which has been described hereinabove, since a high level of air tightness is attained in the contact portion of the cup-shaped case 40 and the collar 20 (igniter assembly 11), the gas leak preventing effect is enhanced.

As the pressure inside the case 40 then reaches or exceeds a certain level, the case 40 ruptures at the fragile portion 41*a*, whereby combustion gas and the like is released outside the case 40 to actuate reliably the seat belt retractor.

Figure 2:
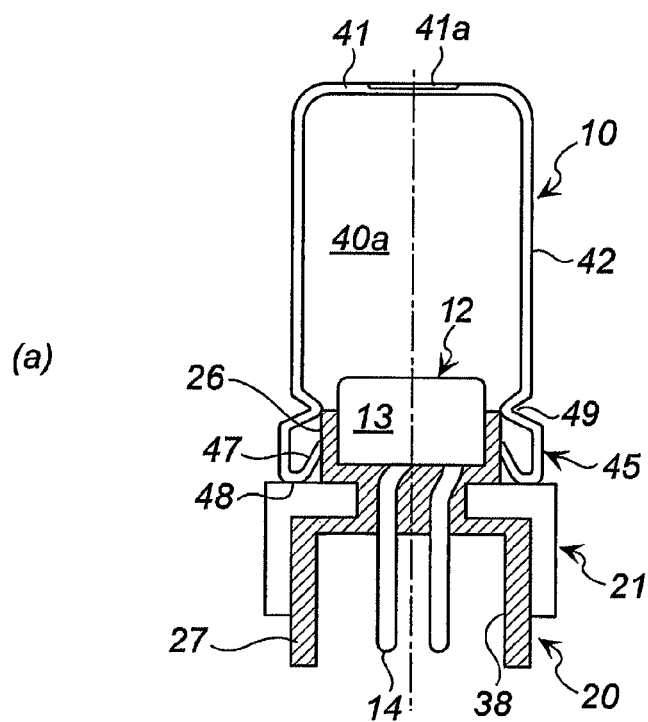
FIG. 2 shows, in (a), an axial sectional view of a gas generator according to an embodiment other than that illustrated by FIG. 1, and in (b), a partial enlarged view of the gas generator shown in (a).
Figure 2:
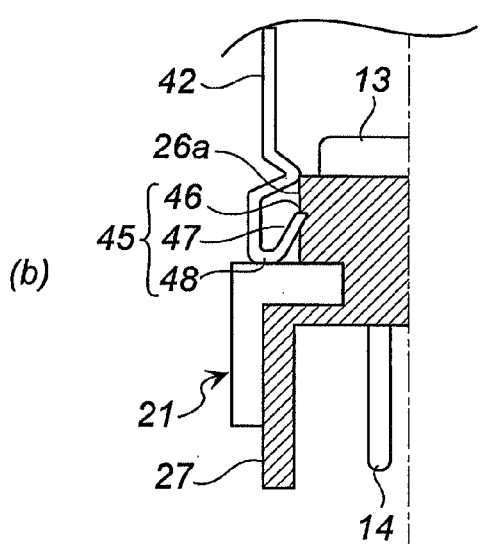

(2) Gas Generator Shown in FIG. 2

An embodiment of the gas generator 10 in accordance with the present invention will be described with reference to (a) and (b) in FIG. 2.

(a) in FIG. 2 shows a state after assembling, and (b) in FIG. 2 is a partially enlarged view of the configuration shown in FIG. 2(*a*).

In the gas generator 10 shown in FIG. 2, the contact structure of the cup-shaped case 40 and the collar 20 (resin columnar part 26) is different from that in the gas generator 10 shown in FIG. 1, and only the different components will be described below.

In the gas generator 10 shown in FIG. 2, the cup-shaped case and the collar is fixed to each other by the tip of the inner annular tilted surface 47*a* being in contact with the peripheral surface 26*a* of the resin columnar part 26, and a portion including the annular terminal end 46 and the vicinity thereof embedding into the peripheral surface 26*a*. Therefore, the fixing strength of the cup-shaped case 40 and the collar 20 is increased.

The gas generator 10 shown in FIG. 2 can be manufactured by adding one step to the method for assembling the gas generator 10 shown in FIG. 1.

After the collar 20 (igniter assembly 11 shown in FIG. 1) has been fitted into the cup-shaped case 40, the collar 20 is slightly pulled out axially in the opposite direction. At this point, the inner corner portion of the annular terminal end 46 is caught in the peripheral surface 26*a* of the resin columnar part 26, the annular tilted surface 47 is further tilted inward, and the portion including the annular terminal end 46 (the annular terminal end 46 and the annular tilted surface 47 near the annular terminal end 46) is embedded into the peripheral surface 26*a* of the resin columnar part 26. Alternatively, the cup-shaped case 40 may be rotated around the igniter assembly 11.

Figure 3:
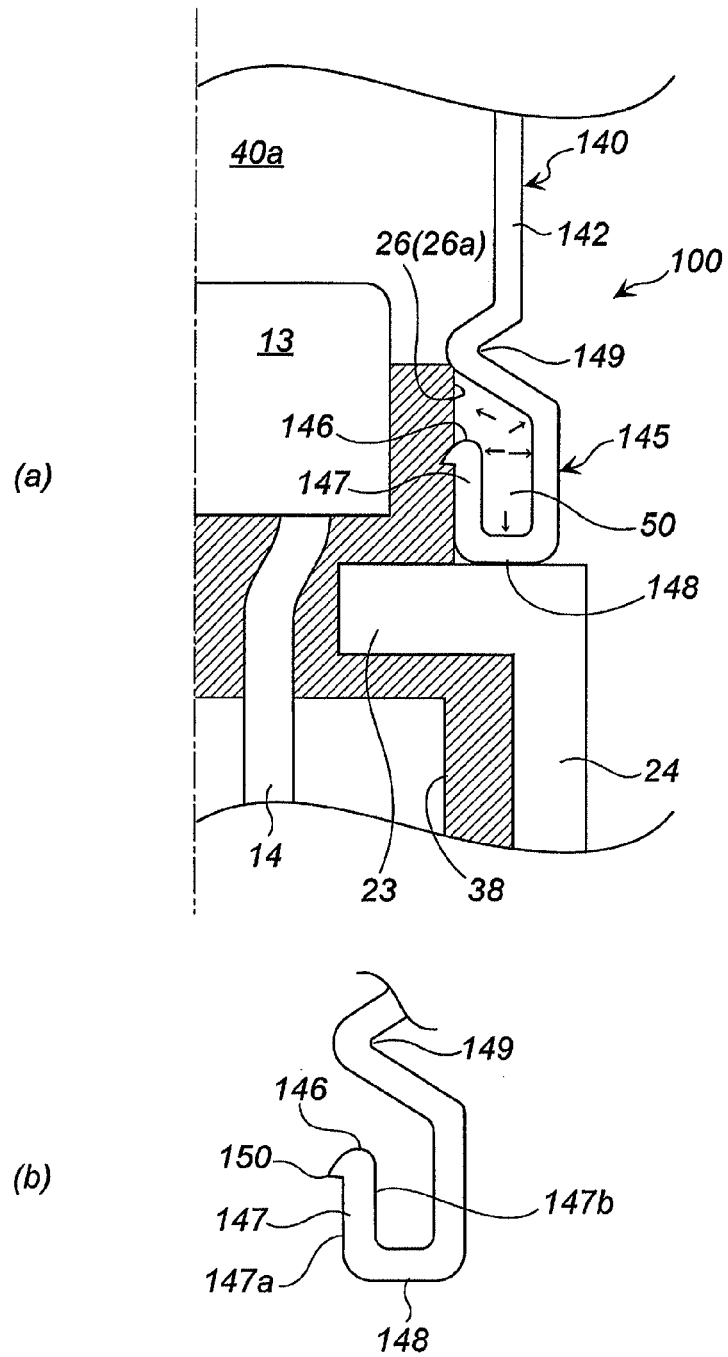
FIG. 3 shows, in (a), a partial axial sectional view of a gas generator according to an embodiment other than those illustrated by FIG. 1 and FIG. 2, and in (b), a partial enlarged view of the cup-shaped cases used in the gas generator shown in (a).

(3) Gas Generator Shown in FIG. 3

A gas generator 100 shown in FIG. 3 is the same as the gas generator 10 shown in FIG. 1 except that a shape of the annular bent portion of the cup-shaped case is different.

A cup-shaped case 140 has an annular bent portion 145.

The annular bent portion 145 has an annular bent corner 148, an annular tilted surface 147, and an annular terminal end 146.

The annular tilted surface 147 includes an outer annular tilted surface 147*b* on a circumferential wall surface 142 side of the cup-shaped case 140 and an inner annular tilted surface 147*a* on the opposite side.

The annular bent portion 145 has an annular protrusion 150 protruding from the inner annular tilted surface 147*a* in the vicinity of the annular terminal end 146.

In the gas generator 100 using such cup-shaped case 140, the fixed configuration is obtained by the inner annular tilted surface 147*a* being in press-contact with the peripheral surface 26*a* of the resin columnar part 26, and the annular protrusion 150 embedded into the resin columnar part 26 (peripheral surface 26*a*).

The gas generator 100 can be manufactured by using the assembling method same as that used to assemble the gas generator 10 shown in FIG. 1.

Figure 4:
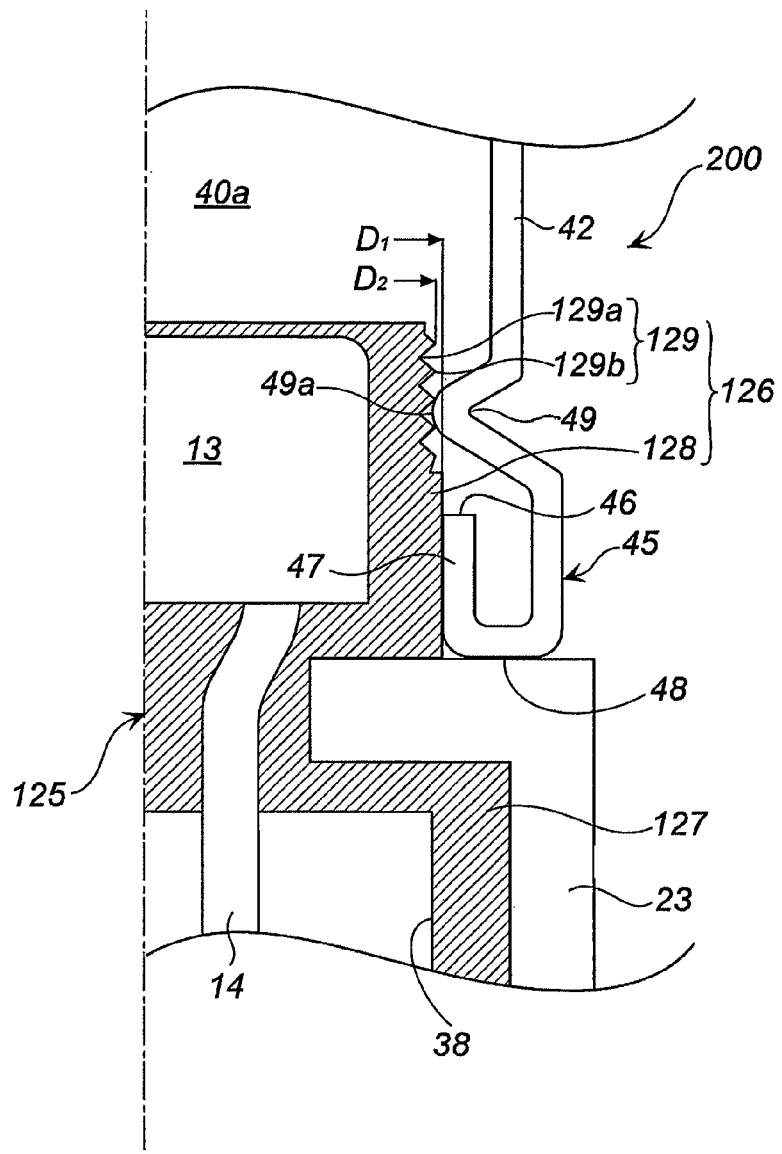
FIG. 4 shows a partial sectional view in the axial direction illustrating an embodiment other than those illustrated by FIGS. 1 to 3.

(4) Gas Generator Shown in FIG. 4

The gas generator 200 in FIG. 4 is the same as the gas generator 10 shown in FIG. 1 except that the outer shape of the resin columnar part is different from the resin columnar part 26 of the gas generator 10 shown in FIG. 1.

A resin portion 125 has a resin columnar part 126 that encloses and fixes the ignition portion 13 of the igniter and a pair of conductive pins 14 and a cylindrical wall portion 127 forming a space for fitting the connector.

The resin columnar part 126 has a columnar part 128 and a threaded groove part 129.

The columnar part 128 has a uniform diameter (D1).

The threaded groove part 129 includes a valley portion 129*a* and a peak portion 129*b*.

The outer diameter D1 of the columnar part 128 is larger than the outer diameter D2 of the peak portions 129*b*.

In a state before the cup-shaped case 40 is attached, the relationship (d2<D1) between the outer diameter D1 of the columnar part 128 and the inner diameter (d2) of the annular terminal end 46 is the same as in the gas generator 10 shown in FIG. 1.

In a gas generator 200, the fixed configuration is obtained by the annular tilted surface 47 being in press-contact with the columnar part 128 and the inner tip 49*a* of the concave portion 49 being fitted into the valley portion 129*a* of the threaded groove part 129.

The gas generator 200 can be assembled in the same manner as the gas generator 10 shown in FIG. 1, but a method of attaching by screwing in a state in which the threaded groove part 129 is mated with the concave portion 49 can be also used.

The gas generators shown in FIGS. 1 to 4 described hereinabove can be used not only as gas generators for seat belt retractors, but also as gas generators for airbags or as ignition means used therein.

Figure 5:
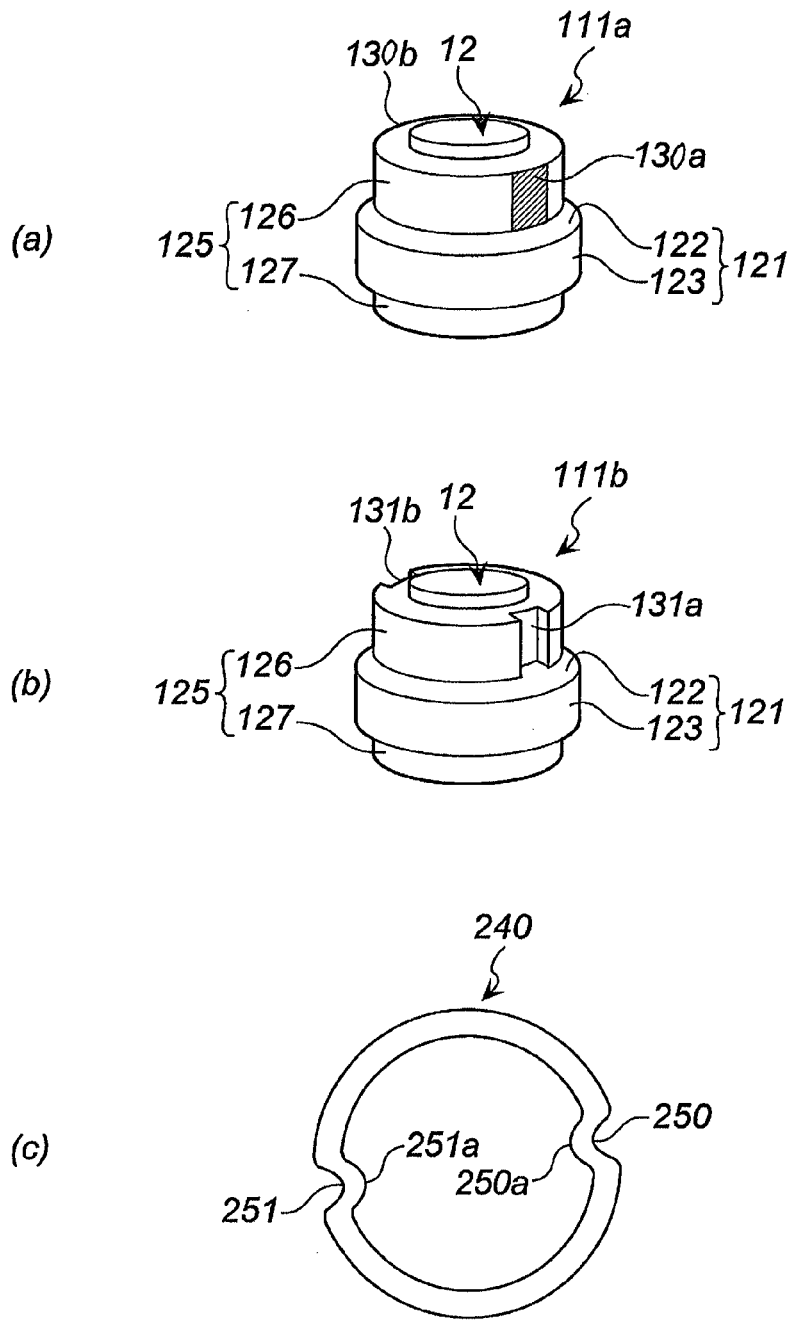
FIG. 5 shows, in (a), a perspective view of an igniter assembly according to an embodiment other than those illustrated by FIGS. 1 to 4, in (b), a perspective view of an igniter assembly according to an embodiment other than those illustrated by FIGS. 1 to 4 and (a), and, in (c), a radial partial sectional view of the cup-shaped case to be mated with the igniter assemblies shown in (a) and (b).

(5) Gas Generator Shown in FIG. 5

FIG. 5(*a*) is a perspective view of an igniter assembly 111*a* corresponding to the igniter assembly 11 shown in FIG. 1.

The igniter 12 used in the igniter assembly 111*a* shown in FIG. 5(*a*) is the same as that shown in FIG. 1.

The collar includes a combination of a metallic portion 121 and a resin portion 125 integrated with the metallic portion 121.

The metallic portion 121 has an annular bottom surface part 122 and a circumferential wall surface part 123.

The resin portion 125 has a resin columnar part 126 that encloses and fixes the ignition portion of the igniter 12 and a pair of conductive pins, and a cylindrical wall portion 127 forming a space for fitting the connector.

The igniter assembly 111*a* shown in FIG. 5(*a*) differs from the igniter assembly 11 shown in FIG. 1 in that flat surfaces 130a, 130b are formed at two locations of the peripheral surface in the resin columnar part 126.

The flat surfaces 130a, 130b are formed by machining the outer peripheral surface (curved surface) of the resin columnar part 126 along the axial direction.

The flat surface 130a and the flat surface 130b are formed at positions in mutually opposing sides.

When the igniter assembly 111a shown in FIG. 5(a) is used, a cup-shaped case 240 is used that has two concave portions 250, 251 formed independently at mutually opposing sides, as shown in FIG. 5(c).

FIG. 5(c) illustrates the positional relationship of the two concave portions 250, 251 in a state in which the bottom surface 41 having a fragile portion in the cup-shaped case 40 shown in FIG. 1(a) is omitted.

The two independent concave portions 250, 251 of the cup-shaped case 240 are formed such that when the igniter assembly 111a is fitted, inner tips 250a, 251a of the concave portions are abutted against the flat surfaces 130a, 130b.

When the igniter assembly 111a having the flat surface 130a and the flat surface 130b is assembled with the cup-shaped case 240 having two independent concave portions 250, 251 at corresponding positions to the two flat surfaces, the inner tips 250a, 251a of the two independent concave portions 250, 251 are abutted against the flat surface 130a and the flat surface 130b, thereby facilitating the alignment and also preventing the rotation in the circumferential direction.

FIG. 5(b) is a perspective view of an igniter assembly 111b corresponding to the igniter assembly 11 shown in FIG. 1.

The igniter 12 used in the igniter assembly 111b shown in FIG. 5(b) is the same as that shown in FIG. 1.

The collar includes a combination of the metallic portion 121 and the resin portion 125 integrated with the metallic portion 121.

The metallic portion 121 has the annular bottom surface part 122 and the circumferential wall surface part 123.

The resin portion 125 has the resin columnar part 126 that encloses and fixes the ignition portion of the igniter and a pair of conductive pins, and the cylindrical wall portion 127 forming a space for fitting the connector.

The difference between the resin columnar part 126 of the igniter assembly 111b shown in FIG. 5(b) and that of the igniter assembly 11 shown in FIG. 1 is that grooves 131a, 131b are formed in two locations at the peripheral surface.

The grooves 131a, 131b are portions serving as grooves of a certain depth that are formed by machining the outer peripheral surface (curved surface) of the resin columnar part 126 along the axial direction.

The groove 131a and the groove 131b are formed at mutually opposing positions.

When the igniter assembly 111b shown in FIG. 5(b) is used, the cup-shaped case 240 shown in FIG. 5(c) is used.

The two independent concave portions 250, 251 of the cup-shaped case 240 are formed such that when the igniter assembly 111b is fitted, the inner tips 250a and 251a of the concave portions 250a, 250b are abutted against the groove 131a and the groove 131b.

When the igniter assembly 111b having the groove 131a and the groove 131b is assembled with the cup-shaped case 240, the inner tips 250a and 251a of the two independent concave portions are abutted against the groove 131a and the groove 131b, thereby facilitating the alignment and also preventing the rotation in the circumferential direction.

The flat surface shown in FIG. 5(a) and the groove shown in FIG. 5(b) may be provided in one location or in two or more locations.

In the case of being provided in one location, the alignment function is realized, but the rotation preventing function is weak. In the case of two or more locations, all of the flat surfaces or grooves are formed with equal spacing. It is also possible to combine the grooves with the flat surfaces. It is also possible that some of the plurality of concave portions 250 only abut against the flat surfaces 130a, 130b or grooves 131a, 131b, and the remaining concave portions 250 are abutted against the resin columnar part 126.

The invention thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A gas generator comprising:
an igniter having an ignition portion and a conductive pin;
a collar holding the igniter,
a metallic cup-shaped case fixed to the collar and having a fragile portion, and charged therein with a gas generating agent,
the collar being formed by integrating a metallic portion and a resin portion, and the resin portion having a resin columnar part enclosing at least part of a peripheral surface of the ignition portion,
the metallic portion being in a substantially cup-like shape having an annular bottom surface part and a circumferential wall, and an outer diameter of the circumferential wall being set to be larger than an outer diameter of the resin columnar part,
the cup-shaped case having an annular bent portion obtained by bending inward an end portion of an opening thereof,
the annular bent portion including an annular bent corner, an annular tilted surface, and an annular terminal end, and the annular tilted surface including an outer annular tilted surface facing toward a side of a peripheral surface of the cup-shaped case and an inner annular tilted surface facing the opposite side thereof,
in the cup-shaped case and the collar, the inner annular tilted surface of the annular bent portion pressing against a peripheral surface of the columnar part of the resin portion.

2. The gas generator according to claim 1, wherein the cup-shaped case and the collar are fixed to each other by pressing the inner annular tilted surface of the annular bent portion against the peripheral surface of the columnar part of the resin portion and abutting the annular bent corner against the annular bottom surface part of the metallic portion of the collar.

3. The gas generator according to claim 1, wherein
the cup-shaped case and the collar are fixed to each other in a state in which part of the inner annular tilted surface of the annular bent portion is pressed against the peripheral surface of the resin columnar part, and a portion including the annular terminal end is embedded into the resin columnar part.

4. The gas generator according to claim 1, wherein
the annular bent portion of the cup-shaped case has an annular protrusion protruding from the inner annular tilted surface in the vicinity of the annular terminal end, and
the cup-shaped case and the collar are fixed to each other in a state in which the inner annular tilted surface of the annular bent portion is pressed against the peripheral surface of the resin columnar part, and the annular protrusion is embedded into the resin columnar part.

5. The gas generator according to claim 1, wherein
the cup-shaped case has a concave portion receding inward at the peripheral surface thereof, an inner tip of the concave portion is abutted against the resin columnar part, and an annular space communicating with an inner space of the cup-shaped case charged with the gas generating agent is formed by an inner wall surface of the annular bent portion and the resin columnar part.

6. The gas generator according to of claim 1, wherein
the cup-shaped case has a concave portion receding inward at the peripheral surface thereof,
the resin columnar part has a threaded groove at an outer surface that is not in contact with the inner annular tilted surface of the annular bent portion, and
the inner tip of the concave portion of the cup-shaped cap is abutted against a valley portion of the threaded groove.

7. The gas generator according to of claim 1, wherein
the cup-shaped case has one or a plurality of concave portions receding inward at the peripheral surface thereof,
the resin columnar part has one or a plurality of flat surfaces or grooves formed in the axial direction at the peripheral surface thereof, and
the inner tip of the one or plurality of concave portions of the cup-shaped case is abutted against one or a plurality of flat surfaces or grooves of the resin columnar part.

* * * * *